Feb. 28, 1933.   A. HEYLAND   1,899,462
POLYPHASE COMMUTATOR MACHINE
Filed March 26, 1931   5 Sheets-Sheet 2

Patented Feb. 28, 1933

1,899,462

UNITED STATES PATENT OFFICE

ALEXANDER HEYLAND, OF BRUSSELS, BELGIUM

POLYPHASE COMMUTATOR MACHINE

Application filed March 26, 1931, Serial No. 525,484, and in Belgium April 9, 1930.

The specification of my U. S. Patent No. 1,754,017 describes stator windings for polyphase commutator machines in which the winding pitch is reduced to a fraction of the normal winding pitch on the rotor.

This invention relates to polyphase commutator machines and more particularly to their adaptation to serve as self-exciting generators for use, for instance. as polyphase exciters for asynchronous motors.

A series machine with an ordinary stator winding, whether equipped with commutating poles or not, cannot be successfully used for this purpose; for if its self-excitation is made sufficient to compensate or overcompensate the asynchronous motor on no load, the motor becomes unstable. For with an ordinary stator winding if the ampere turns are designed to produce both a sufficient commutating component and also a sufficient component for self-excitation the phase of the latter becomes such that the asynchronous motor acts also as a generator producing a current of frequency slightly below that of the mains, so causing inadmissible surging.

In my former patent I have shown how the requisite commutating and self-exciting fields may be obtained by a different current distribution which obviates this disadvantage, by employing windings of which the pitch is reduced to a fraction of the winding pitch on the rotor.

My present invention is a scheme of stator winding by which a similar current distribution can be got with a main winding pitch in each section of the winding corresponding to the rotor winding pitch. According to the invention the windings per pole are divided into a greater number of parts than corresponds with the phase number, and these parts are so connected that the circuit of each phase is located at a plurality of points per pole and the resulting current distribution is that which would be obtained by reducing the stator winding pitch to a fraction of the winding pitch on the rotor. In particular I may thus achieve the same current distribution as would result from reducing the stator winding pitch to one half the rotor winding pitch, so that when rotor and stator are in series, for a position of the brushes in which the stator current on one side of the brush zone is opposite to the rotor current as in a compensating winding, the current on the other side of the brush zone is in exact opposition to the brush current as in a commutating pole winding. This latter current combined with the rotor current at the same spot produces the resultant magnetizing ampere turns of the machine.

For the better understanding of the present invention it is convenient first to examine the functioning of windings arranged according to my former patent; and Figures 1 to 3 of the accompanying drawings are provided for this purpose.

Figure 1:
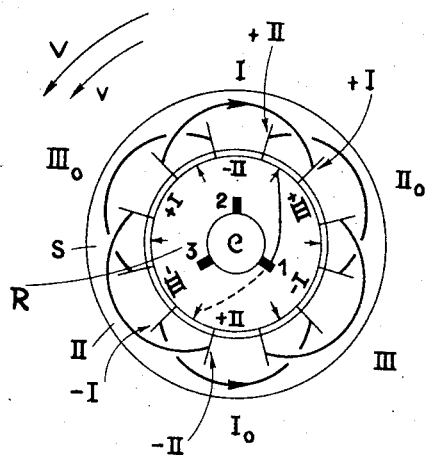
Fig. 1 is a diagram showing a bipolar arrangement of a known machine with a normal pole pitch on the rotor, indicated for a single turn, and a stator winding pitch of ½ the pole pitch.

Figure 1 shows a bipolar arrangement of the kind described in my patent for a machine with a pole pitch on the rotor R as indicated for a single turn and a stator winding pitch of ½ the pole pitch. The stator S has 12 slots indicated by radial lines, and a three-phase winding, the coils of which have a pitch of three slots. C is the commutator with three brushes.

The purpose of this scheme was to produce a satisfactory commutating field and moreover to produce ampere turns for self excitation of such phase that the field would rotate in the same direction as the rotor. When such a generator is connected with another source of current the scheme makes possible automatic adaptation of the frequencies of the two sources to each other, an effect not obtainable with ordinary stator windings.

This effect has been found of importance when the scheme is applied to series commutator machines especially when they are used as self exciting series polyphase excitators for asynchronous motors.

It is known that all attempts to use for this purpose series machines with ordinary stator windings with or without commutating poles have failed; for if the self-excitation is made sufficient to compensate or overcompensate the asynchronous motor on no load the working of the motor becomes unstable. This is due to a harmful effect of the ordinary stator winding. For when the stator ampere turns are designed to produce both a sufficient component for good commutation and another component sufficient for self-excitation, the phase of the latter becomes such that the asynchronous motor tends to generate at a frequency slightly below that of the mains. If the machine were driven mechanically as a generator its negative slip and its speed would be automatically adjusted to this self-excitation as an asynchronous generator. But when the machine is working as a motor a phase of the exciter field which does not adapt itself to the working of the motor sets up this second frequency and causes large surges of current in the mains which cannot be allowed.

With the scheme of my former Patent 1,754,017 when used for this purpose the commutating field and the self-excitation are obtained by a different distribution of current in the stator which obviates this disadvantage.

For the machine to operate as a self-exciting generator the brushes are so set that the rotor ampere turns approximately opposed to the stator ampere turns and their axis is about 30° behind the direction of rotation V of the rotor. This gives a brush setting such as is shown in Figure 1 in which phase I of the stator is in series with brush 1, phase II with brush 2 and phase III with brush 3. The zones of commutation are at the positions marked with small arrows where the stator coils of different phase cross. Then looking at the zones of commutation of the coil shown which is at the moment short-circuited by brush 1, it will be found that the stator slots following these zones contain currents (+II) exactly opposite to the rotor current (−II) at those points, as would be the case in a compensating winding, and the stator slots preceding these zones contain currents (+I) exactly opposite to the brush current (−I) as would be the case in a commutating pole winding. Moreover the latter currents (+I) compound with the rotor currents (+III) at these points to produce the major part of the magnetizing ampere turns of the machine.

This analysis, showing three separate effects due to this winding, indicates that by suitable design of dimensions and other details of construction, on one hand perfect commutation may be obtained, and on the other hand the phase of the resultant field of the exciter relatively to the rotor current may be so chosen that the field rotates in the same direction $v$ as the rotor V, and the frequency generated and the motor slip will automatically adapt to each other.

So with self-exciting series polyphase exciters having windings of this kind, contrary to the result with ordinary stator windings, it is just the series self-excitation which makes the working of the asynchronous motor stable. This is demonstrated more clearly in as much as when a shunt winding is added to the exciter and used to regulate the over-compensation of the asynchronous motor to any desired extent, the series excitation still wholly suppresses any tendency to hunting of the motor which so readily results when ordinary shunt exciters are used for compensation regulation.

It now appears desirable in some cases to obtain the above-explained results of the winding scheme of Patent No. 1,754,017 by a different scheme of stator windings.

Figure 2:
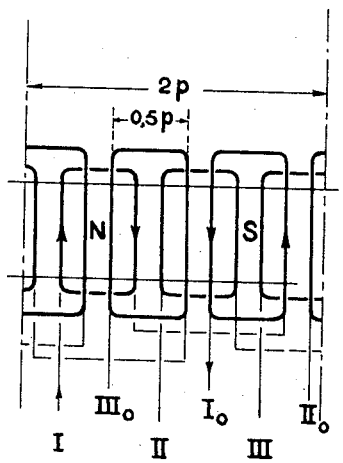
Fig. 2 is a diagram showing the windings and connections for the arrangement according to Fig. 1.

Figure 2 shows the windings and connections for the arrangement of Fig. 1. If the coils are wound of several thin conductors, winding them to half the pole pitch lessens the length of turn, and the coils of one phase —for instance the coils I, I₀ for the two pole scheme which would produce opposite poles N, S when the current flows as indicated— can be joined by a similarly thin connector, for instance in series as indicated.

As a rule polyphase exciters for large currents are made multipolar, the larger the current and power the larger the number of poles; and their rotors have parallel windings. In these cases it is found to be important to join in series all the coils at poles of the same polarity. For if they are joined in parallel the magnitude and phase of the currents may depart at certain places from the distribution above described, and the departure may be accentuated by the reaction of the rotor current and give rise to current surges. So for large currents the windings, preferably built of bars, form coils of few turns per pole and phase.

Figure 3:
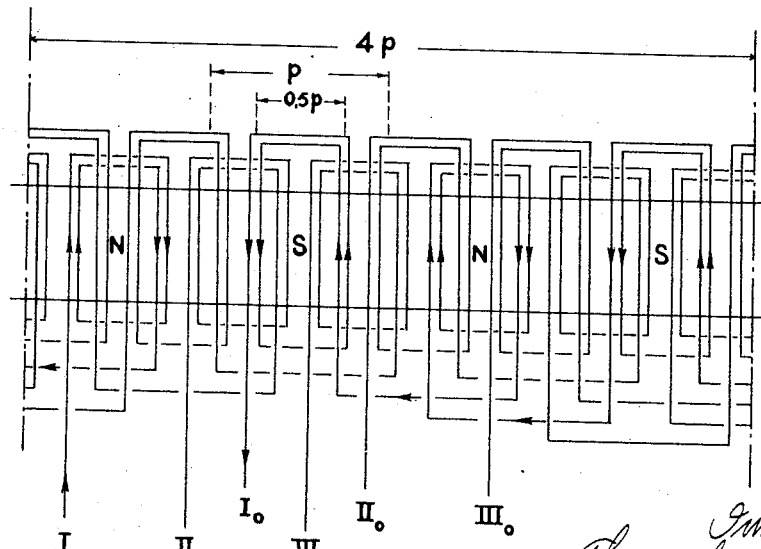
Fig. 3 is a diagram showing the windings for heavy currents, in which the coils have two turns per pole and phase.

Figure 3 shows such a scheme in which, for example, the coils have two turns per pole and phase. A 4-pole scheme is shown; for larger numbers of poles it can be extended in similar fashion the arrangement of terminals for current supply remaining the same. Such a bar winding forming separate coils can only be built by placing the bars side by side; if there are 6 slots per pole, 24 in all, there will be two bars per slot; with 48 slots there will be one bar per slot. The mean winding pitch is still 0–5 $p$ where $p$ is the pole pitch. In such a winding the bars should be joined by arcuate end connections in different planes of the same cross-section as the bars. Figure 3 shows that the connections between coils should be arranged by lengthening certain bars at four different positions along the stator so that they take up a good deal of room.

It would seem of advantage in some cases to get the same result with a different stator winding of half pole pitch in which the bars are arranged like those of certain ordinary three phase winding, i. e. like a 2-layer D. C. drum winding, by using a connection different from the uniform and symmetrical connections of such a winding a different connection per resultant phase to form an ordinary three phase winding.

The winding scheme of Figure 2, like that of Figure 3, shows that to get the effect explained a current of given phase should occur at 4 different places per pole pair spaced apart by 90°, the current flowing in one direction in two succeeding places and in the opposite direction in the next two. This distribution cannot be secured with a drum winding of half pole pitch.

On the other hand it will be shown that the same distribution as is secured in Figures 2 and 3 by a winding of half pole pitch can also be obtained with a winding of which the mean pitch is equal to the pole pitch, by connections different from the symmetrical connections at certain points per phase.

The object of this invention is to construct stator windings with a mean pitch equal to the pitch of the rotor, and to provide at certain points connections different from the symmetrical connections so that the resultant distribution of current in the stator becomes the same as if its winding pitch was a fraction of the rotor pitch.

Figures 4 to 11 show different schemes for this purpose. They are all shown as 4 pole schemes; for larger numbers they would be extended in similar fashion. They are supposed to be for 6 slots per pole. The conductors of bars are shown in the usual way, the end connections of bars at the bottom of the slots being shown broken, and those for the top bars in full lines.

Figure 4:
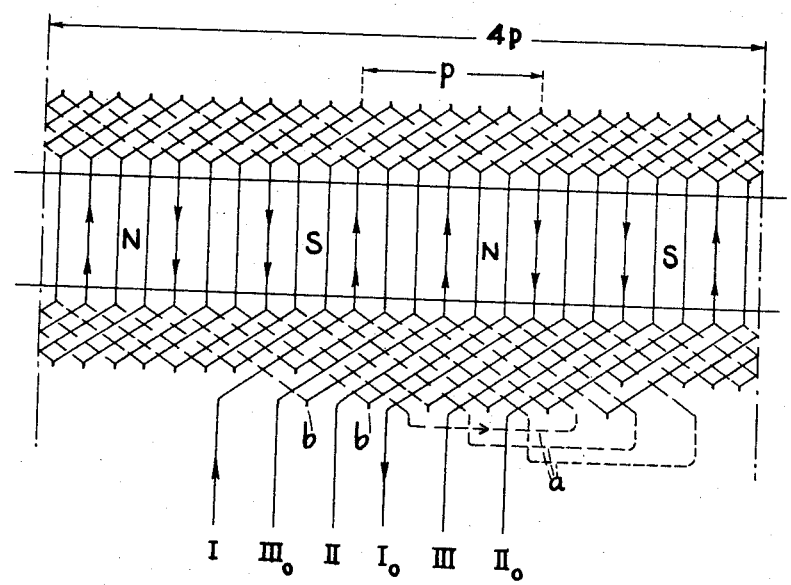
Fig. 4 is a diagram of a scheme in which the winding pitch as indicated at the back end is equal to the pole pitch $p$.

Figure 4 shows a scheme in which the winding pitch, as indicated at the back end, is equal to the pole pitch $p$. At the front end the connections $a$ are such as are used in an ordinary three phase winding. Besides the diagram shows connections $b$, here two per phase, connecting bars (in the case illustrated) 1½ pole pitches apart. If the direction of the current for one phase be followed, e. g. from I to $I_0$, it will be seen from the arrows that the distribution is the same as in the 4 pole winding with half pole pitch of Figure 3.

Figure 5:
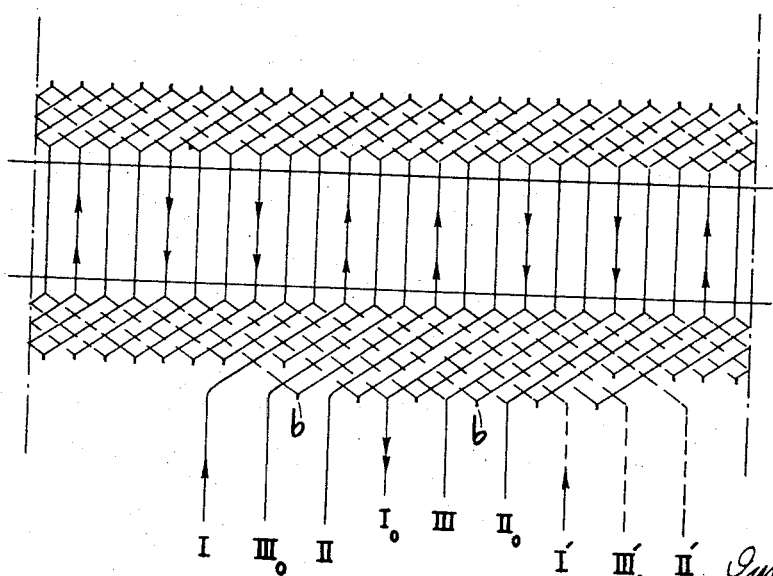
Fig. 5 is a diagram of a similar scheme in which the connections $a$ are omitted.

Figure 5 shows the same scheme without the connections $a$ the windings per phase being connected in two groups in parallel of which the bars are in the same slots. The effect is that instead of 2 effective bars per slot (Figure 4) there is here 1 effective bar per slot. In multipolar machines the terminals of one end per phase, for example I and I′ will be at greater distances apart, while the other ends, as for example $I_0$ can be joined by a single connection such as $b$. The connections $b$ can, as assumed in the figures, be formed by prolonging the bars a trifle at these places.

Figure 6:
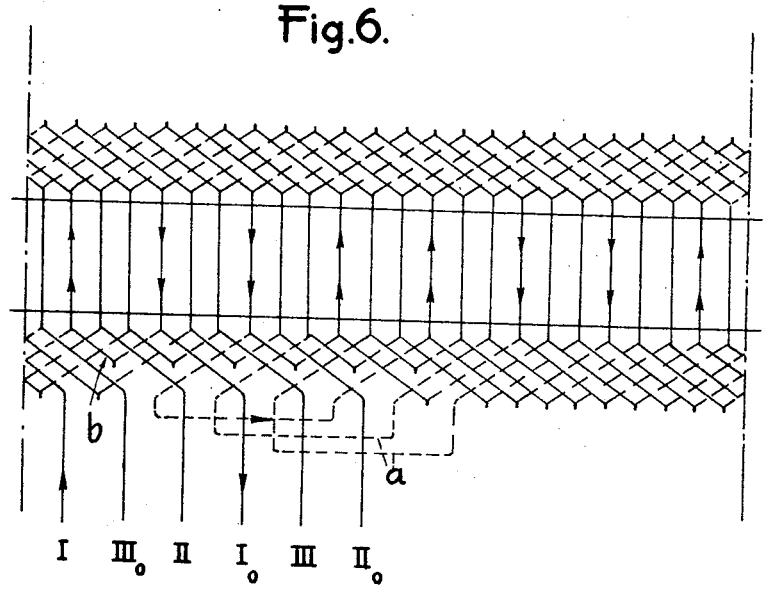
Fig. 6 is a diagram of a scheme similar to that according to Fig. 4, in which the connections $b$, at two points per phase, connect bars at ½ the polar pitch apart.

Figure 6 is a diagram similar to Figure 4, there again being 2 effective bars per slot, with the difference that the connections $b$ different from the other symmetrical connections connect bars at ½ the polar pitch apart.

Figure 7:
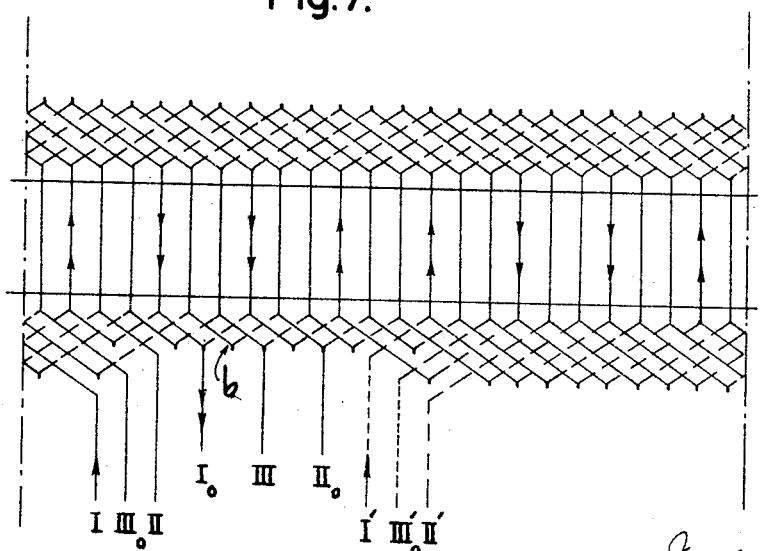
Fig. 7 is a diagram of a scheme, similar to that of Fig. 5, showing the connection of the winding per phase in two groups in parallel.

Figure 7 shows, with the same difference, an arrangement with a similar effect to Figure 5, namely the connection of the winding per phase in two groups in parallel thus providing 1 effective bar per slot.

For windings with greater numbers of bars per phase and pole, the embodiments of Figures 4 and 5 become more advantageous since all the soldering points of the various connections become more accessible.

Figure 8:
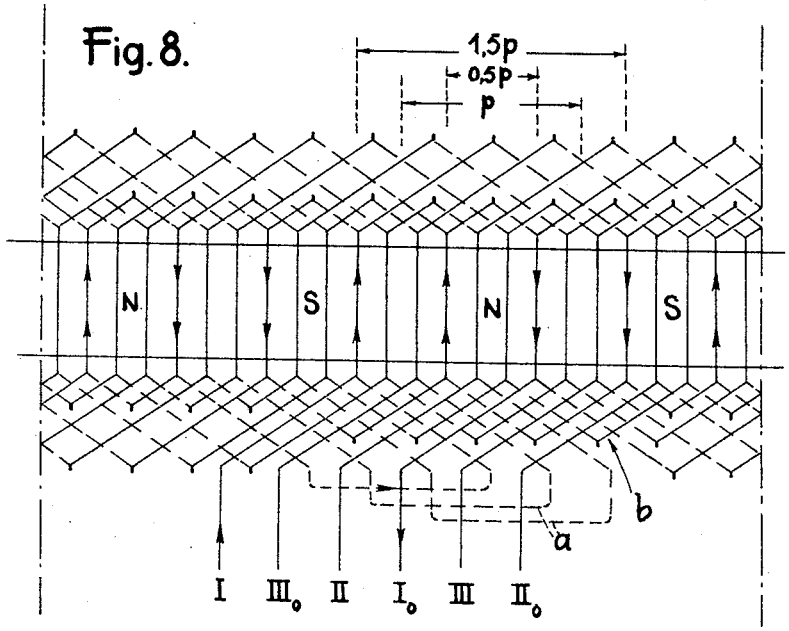
Fig. 8 is a diagram of a modified scheme in which the winding pitch, (aside from the connections $b$) is alternately 1½ and ½ the polar pitch and the mean pitch is equal to the polar pitch.

Figure 8 is a diagram for another mode of carrying out the invention in which the winding pitch is alternately 1½ and ½ the polar pitch, the mean pitch again being equal to the polar pitch $p$. The diagram shows that this case also enables an arrangement of bars to be used as in a D. C. drum winding, since all the external parts of the bars at the tops of the slots are bent in one direction, and those of the bars at the bottoms of the slots in the opposite direction. Hence the different connections $b$ are again two per phase and they are designed for example so that they connect two bars a polar pitch apart. The arrangement again provides 2 effective bars per slot as in Figures 4 and 6. If the direction of the current for one phase is followed, for example I—I₀ the arrows show again the same distribution.

Figure 9:
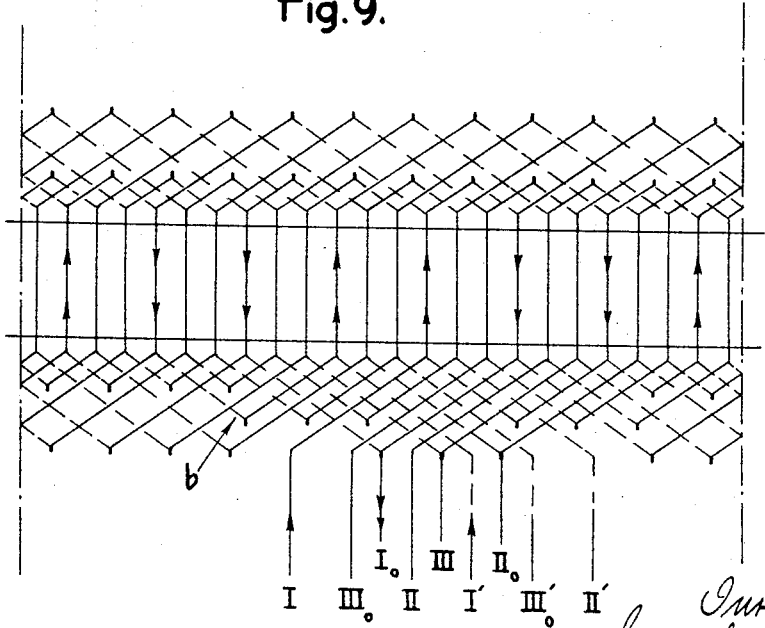
Fig. 9 is a diagram of a similar scheme, with two groups per phase connected in parallel.

Figure 9 shows a similar arrangement, but with two groups per phase connected in parallel, as explained with reference to Figures 5 and 7 and providing therefore 1 effective bar per slot.

This arrangement enables a further effect to be obtained. As explained above, in multipolar machines, it is necessary to avoid bars located in similar positions with respect to the various poles of the same polarity being in parallel, and it will be observed that with this arrangement there are 4 groups of bars which fulfill these conditions, as will be shown with reference to Figure 10.

Figure 10:
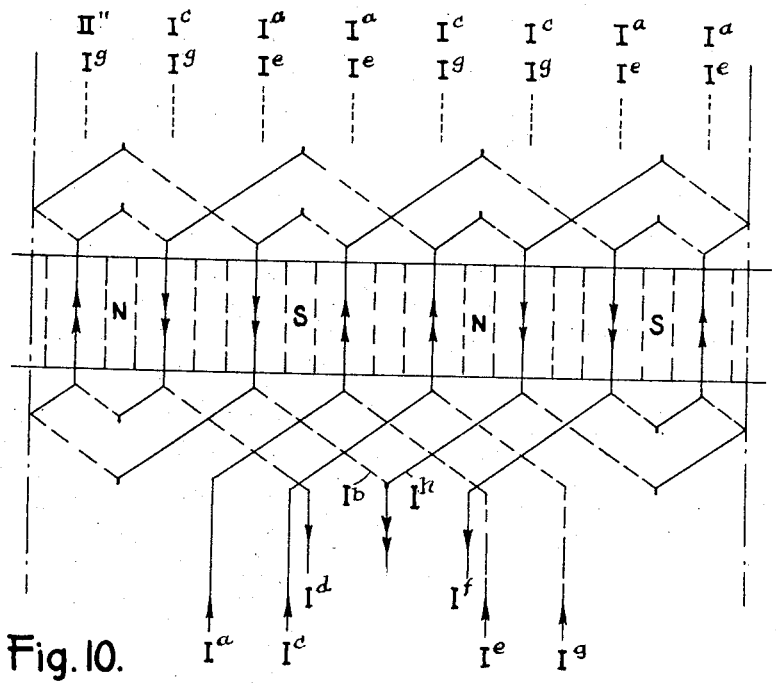
Fig. 10 is a diagram of a scheme in which three phases are indicated, and the circuits of the bars are divided into four groups.

In Figure 10, for clearness, only the bars of one of the three phases are shown and the circuits of those bars are divided into 4 groups $I^a$, $I^b$, $I^c$, $I^d$, $I^e$, $I^f$, $I^g$, $I^h$. If the direction of the currents in those 4 groups is followed it will be seen that, as is indicated above the diagram, all the bars in the same slots of groups $I^c$ and $I^g$, appear in the same positions with respect to the N poles, as do the bars in the other slots of groups $I^a$ and $I^e$ with respect to the S poles. That is to say the 4 groups per phase can without inconvenience be connected in parallel which with 2 bars per slot will be equivalent in effect to $2/4 = \frac{1}{2}$ bar per slot. This effect may be useful in an exceptional case of a machine for extremely high current.

Figure 11:
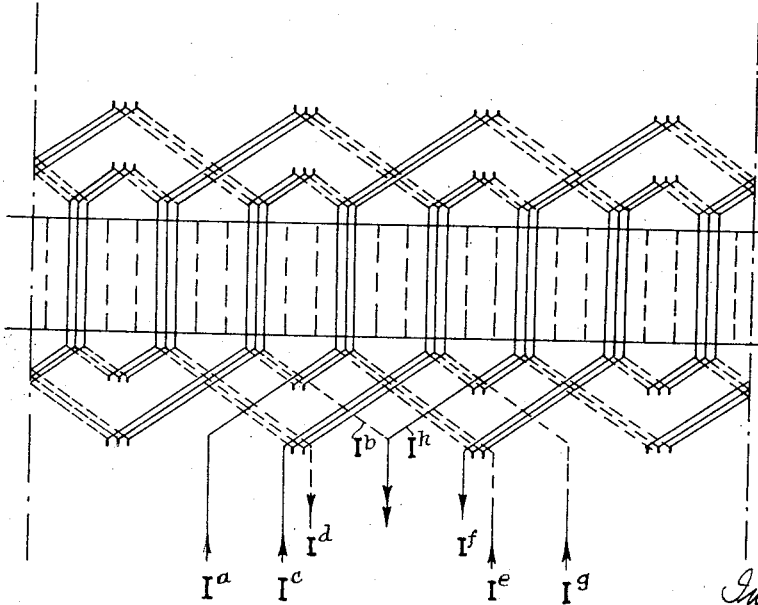
Fig. 11 is a diagram of a similar connection of four groups in parallel, with six bars per slot.

In Figure 11 a similar connection of 4 groups in parallel is shown, with 6 bars per slot, which will be equivalent in effect to $6/4 = 1\frac{1}{2}$ bars per slot. That is to say the arrangement enables values to be obtained which are not whole numbers.

The scheme of connection as described can also be used in a similar manner in other kinds of windings, that is to say those not wound after the fashion of a D. C. drum winding.

Further, in addition to the winding made and connected as described, any other additional winding can be disposed on the stator, for example in known manner a commutating pole winding, enabling other effects or regulations to be achieved.

Instead of the arrangements shown in the diagrams in which the conductors of the main winding located in the same slots belong to the same phase, the conductors can, as will be apparent, be arranged so that conductors belonging to different phases are located in the same slots. In this case the only difference in principle caused by the number of phases per slot is in the end connections which must be designed so that the phase of the total resultant current per slot gives a distribution of current like that obtained with a winding pitch which is a fraction of the normal stator winding pitch, or so that with stator and rotor in series, for a certain position of the brushes, on one side of the brush zone the stator current is opposite to the rotor current and on the other side of the zone it is opposite to the brush current.

Having now particularly described and ascertained the nature of my said invention and in what manner the same is to be performed I declare that what I claim is:

1. A system of interconnecting stator windings of polyphase commutator machines having a mean pitch corresponding to the rotor winding pitch, in which each phase of the winding within the arc of one pole is divided into a plurality of parts of like phase separated by parts of the remaining phases, and so connected that in respect of its resultant current distribution the winding corresponds to a stator winding of reduced pitch.

2. A system of connections according to claim 1, in which the parts of the stator winding are so connected that in respect of its resultant current distribution the winding corresponds to a stator winding of half the rotor winding pitch.

In witness whereof I affix my signature.

ALEXANDER HEYLAND.